United States Patent [19]

Lee et al.

[11] Patent Number: 5,742,683
[45] Date of Patent: Apr. 21, 1998

[54] SYSTEM AND METHOD FOR MANAGING MULTIPLE USERS WITH DIFFERENT PRIVILEGES IN AN OPEN METERING SYSTEM

[75] Inventors: David K. Lee, Monroe; David W. Riley, Easton; Frederick W. Ryan, Jr., Oxford, all of Conn.

[73] Assignee: Pitney Bowes Inc., Stamford, Conn.

[21] Appl. No.: 574,745

[22] Filed: Dec. 19, 1995

[51] Int. Cl.⁶ .................................................. H04K 1/00
[52] U.S. Cl. .................................................. 380/23; 380/3
[58] Field of Search ................................ 380/23, 24, 25, 380/21, 3, 4

[56] References Cited

U.S. PATENT DOCUMENTS

| | | |
|---|---|---|
| 4,725,718 | 2/1988 | Sansone et al. . |
| 4,757,537 | 7/1988 | Edelmann et al. . |
| 4,775,246 | 10/1988 | Edelmann et al. . |
| 4,802,218 | 1/1989 | Wright et al. . |
| 4,812,994 | 3/1989 | Taylor et al. . |
| 4,831,555 | 5/1989 | Sansone et al. . |
| 4,873,645 | 10/1989 | Hunter et al. . |
| 4,958,291 | 9/1990 | Mamone et al. . |
| 4,962,459 | 10/1990 | Mallozzi et al. . |
| 4,980,542 | 12/1990 | Jackson et al. . |
| 5,051,564 | 9/1991 | Schmidt . |
| 5,220,604 | 6/1993 | Gasser et al. . |
| 5,222,135 | 6/1993 | Hardy et al. . |
| 5,224,046 | 6/1993 | Kim et al. . |
| 5,233,658 | 8/1993 | Bianco et al. . |
| 5,263,157 | 11/1993 | Janis . |
| 5,265,163 | 11/1993 | Golding et al. . |
| 5,265,164 | 11/1993 | Matyas et al. .............................. 380/23 |
| 5,339,403 | 8/1994 | Parker ....................................... 380/23 |
| 5,355,474 | 10/1994 | Thuraisngham et al. . |
| 5,590,198 | 12/1996 | Lee et al. .................................. 380/23 |

*Primary Examiner*—David C. Cain
*Attorney, Agent, or Firm*—Charles R. Malandra, Jr.; Melvin J. Scolnick

[57] ABSTRACT

A system and method of managing multiple users of an open metering system, wherein the users have different access privileges, includes the steps of providing a user password system for vault access; programming the vault with a plurality of transition states operatively relating to the user password system; assigning vault functional access to each user password first entered into the user password system; and performing a requested vault function when an entered user password under which the request is made has been assigned vault functional access for the requested vault function. The vault is manufactured in a first state in which the user password system is not activated and the activates the user password system upon entry of an initial user password which changes the vault to a second state that accepts requests for vault functions. The vault is changed to a third state from the second state wherein the user password system remains activated but another user password must be entered before a further request for a vault function is accepted. The requested vault function is rejected when the entered user password under which the request is made has not been assigned vault functional access for the requested vault function.

10 Claims, 5 Drawing Sheets

SYSTEM AND METHOD FOR MANAGING MULTIPLE USERS WITH DIFFERENT PRIVILEGES IN AN OPEN METERING SYSTEM

FIELD OF THE INVENTION

The present invention relates to advanced postage payment systems and, more particularly, to advanced postage payment systems having pre-computed postage payment information.

RELATED APPLICATIONS

The present application is related to the following U.S. patent applications Ser. Nos. 08/575,106 (now U.S. Pat. No. 5,625,694); 08/575,107; 08/574,476; 08/575,110; 08/574,743; 08/575,112; 08/575,109; 08/575,104; 08/574,749 (now U.S. Pat. No. 5,590,198); 08/575,111, each filed concurrently herewith, and assigned to the assignee of the present invention.

BACKGROUND OF THE INVENTION

Postage metering systems are being developed which employ digital printers to print encrypted information on a mailpiece. Such metering systems are presently categorized by the USPS as either closed systems or open systems. In a closed system, the system functionality is solely dedicated to metering activity. A closed system metering device includes a dedicated printer securely coupled to a metering or accounting function. In a closed system, since the printer is securely coupled and dedicated to the meter, printing cannot take place without accounting. In an open metering system the system functionality is not dedicated solely to metering activity. An open system metering device includes a printer that is not dedicated to the metering activity, thus freeing system functionality for multiple and diverse uses in addition to the metering activity. An open system metering device is a postage evidencing device (PED) with a non-dedicated printer that is not securely coupled to a secure accounting module.

Typically, the postage value for a mailpiece is encrypted together with other data to generate a digital token which is then used to generate a postage indicia that is printed on the mailpiece. A digital token is encrypted information that authenticates the information imprinted on a mailpiece including postal value. Examples of systems for generating and using digital tokens are described in U.S. Pat. Nos. 4,757,537, 4,831,555, 4,775,246, 4,873,645 and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block. Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Digital tokens are utilized in both open and closed metering systems. However, for open metering systems, the non-dedicated printer may be used to print other information in addition to the postal revenue block and may be used in activity other than postage evidencing. In an open system PED, addressee information is included in the Postal Data which is used in the generation of the digital tokens. Such use of the addressee information creates a secure link between the mailpiece and the postal revenue block and allows unambiguous authentication of the mail piece.

Conventional postage meters are equipped with a physical key or some type of mechanical or electronic access, such as a smart card, to protect the meter from unauthorized access to the meter. In closed metering systems, such as disclosed in U.S. Pat. Nos. 4,802,218, 5,111,030 and 4,980,542, smart cards are used to control meter access for various meter functions, and to perform administrative functions, such as accounting of departmental use of a meter. Heretofore, such controlled access provided access for certain functions based on the type of smart card inserted into the metering device, but did not provide customized use at the typical user level.

SUMMARY OF THE INVENTION

It has been discovered that for an open metering system, such as a PC-based metering system that comprises a PC, a plug-in peripheral as a vault to store postage funds and a non-secure and non-dedicated printer, it is not practical to install a physical key because the vault is a small, removable, electronic device void of mechanical parts. It has been further discovered that a password system of the vault can protect the vault from illegal or unauthorized access. The present invention provides a method of managing multiple users of the PC-based metering system through a user password system. The method provides password controlled access to the PC-based metering system wherein the use associated with each user password can be customized for restricted access to various functions of the metering system.

The PC-based metering system operates in one of four modes: normal user mode, privileged mode, manufacturing mode and inspection mode. To enter each mode, a mode password assigned to such mode must be entered through the user interface of the PC. The present invention provides security management of multiple users with different privileges that access the different functionality's of the PC-based open metering system in user mode. For example, once activated the user password system requires a valid user password to be entered before the vault can be accessed. Once a user password is entered, the features or functions of the metering system available to the user depends on what functions/features were customized as being accessible for the entered user password. Examples of such user functions/features that are customized to a user password are: vault refill, network meter access, maximum postage amount, destination address limitations, diagnostic and inspection report access, and departmental accounting reports via a local open metering system or a networked open metering system.

In accordance with the present invention, a method of managing multiple users of an open metering system, wherein each of the users have different access privileges, includes programming a vault with a plurality of operational modes, such as manufacturing mode, normal mode, service mode and privileged mode, and assigning a hierarchy to each mode. Each of the modes is assigned with a user password that is required to operate the vault in the respective mode. Each user of the vault is provided with one or more passwords corresponding to the access level assigned to the user. When the vault becomes operational a normal mode password is required to place the vault in normal mode. Once operational, whenever a command is received by the vault for a function corresponding to the manufacturing mode, the service mode or the privileged mode the command must be accompanied by a respective user password. The idle time of the vault is continuously monitored so that the vault can be placed in a non-operational state if the continuous idle time exceeds an idle time limit. The method of the present invention provides security that prevents tampering and false evidence of postage payment and provides the ability to do batch processing of digital tokens.

A system and method of managing multiple users of an open metering system, wherein the users have different access privileges, includes the steps of providing a user password system for vault access; programming the vault with a plurality of transition states operatively relating to the user password system; assigning vault functional access to each user password first entered into the user password system; and performing a requested vault function when an entered user password under which the request is made has been assigned vault functional access for the requested vault function. The vault is manufactured in a first state in which the user password system is not activated and then activates the user password system upon entry of an initial user password which changes the vault to a second state that accepts requests for vault functions. The vault is changed to a third state from the second state wherein the user password system remains activated but another user password must be entered before a further request for a vault function is accepted. The requested vault function is rejected when the entered user password under which the request is made has not been assigned vault functional access for the requested vault function.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
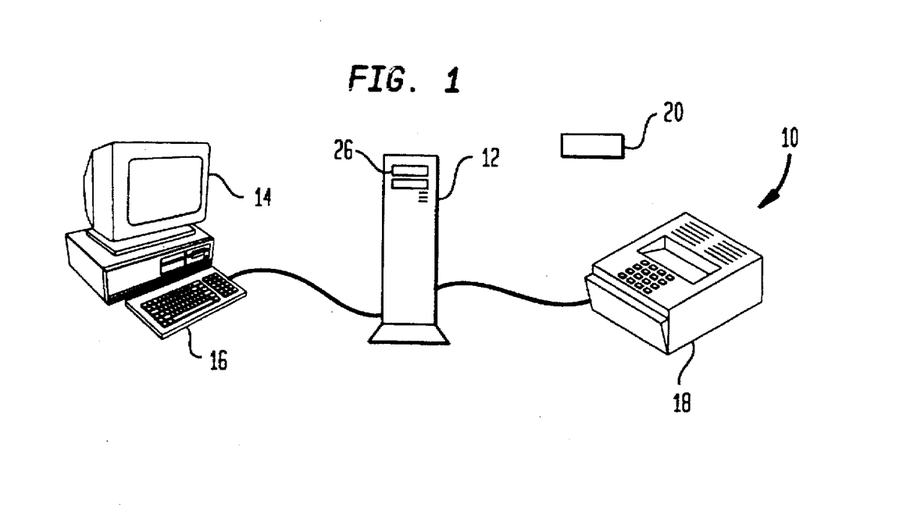
FIG. 1 is a block diagram of a PC-based metering system in which the present invention operates.
Figure 2:
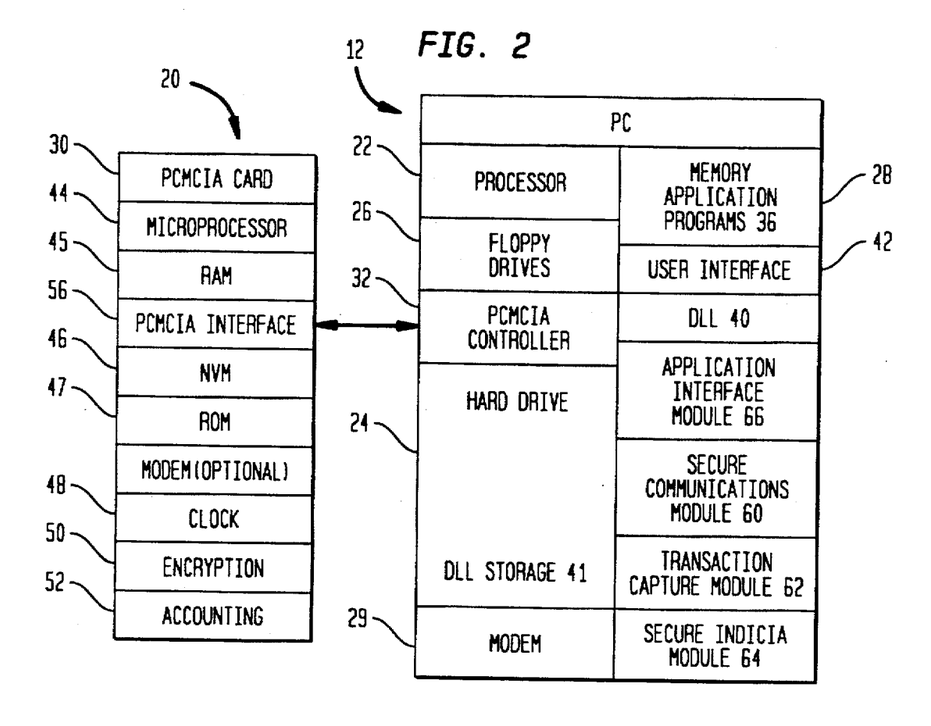
FIG. 2 is a schematic block diagram of the PC-based metering system of FIG. 1 including a removable vault card and a DLL in the PC.
Figure 3:
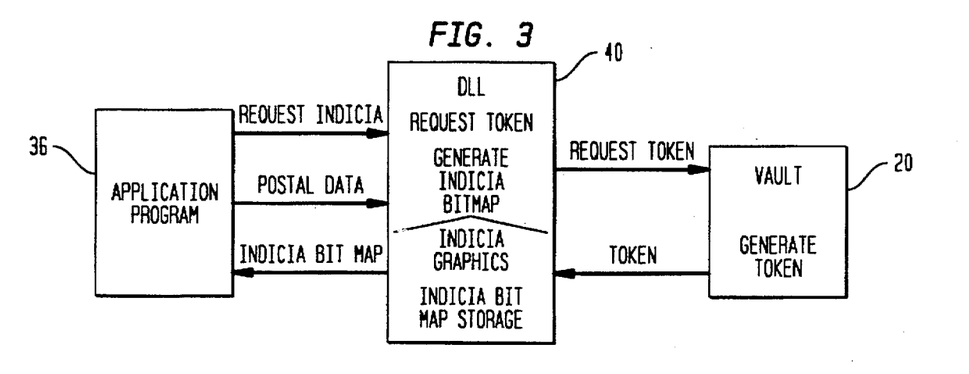
FIG. 3 is a schematic block diagram of the DLL in the PC-based metering system of FIG. 1 including interaction with the vault to issue and store digital tokens.

In describing the present invention, reference is made to the drawings, wherein there is seen in FIGS. 1–3 an open system PC-based postage meter, also referred to herein as a PC meter system, generally referred to as 10, in which the present invention provides a user password system that controls user access. PC meter system 10 includes a conventional personal computer configured to operate as a host to a removable metering device or electronic vault, generally referred to as 20, in which postage funds are stored. PC meter system 10 uses the personal computer and its printer to print postage on envelopes at the same time it prints a recipient's address or to print labels for pre-addressed return envelopes. It will be understood that although the preferred embodiment of the present invention is described with regard to a postage metering system, the present invention is applicable to any-value metering system that includes a transaction evidencing.

As used herein, the term personal computer is used genetically and refers to present and future microprocessing systems with at least one processor operatively coupled to user interface means, such as a display and keyboard, and storage media. The personal computer may be a workstation that is accessible by more than one user. Before describing the present invention a brief description of the PC-based postage meter 10 is provided.

The PC-based postage meter 10 includes a personal computer (PC) 12, a display 14, a keyboard 16, and an non-secured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). In an alternate embodiment the modem may be located in PCMCIA card 30.

PC meter system 10 further includes a Windows-based PC software module 34 (FIGS. 3 and 4) that is accessible from conventional Windows-based word processing, database and spreadsheet application programs 36. PC software module 34 includes a vault dynamic link library (DLL) 40, a user interface module 42, and a plurality of sub-modules that control the metering functions. DLL module 40 securely communicates with vault 20 and provides an open interface to Microsoft Windows-based application programs 36 through user interface module 42. DLL module 40 also securely stores an Indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

PC-based meter system 10 operates as a conventional personal computer with attached printer that becomes a postage meter upon user request. Printer 18 prints all documents normally printed by a personal computer, including printing letters and addressing envelopes, and in accordance with the present invention, prints postage indicia.

The vault is housed in a PCMCIA I/O device, or card, 30 which is accessed through a PCMCIA controller 32 in PC 12. A PCMCIA card is a credit card size peripheral or adapter that conforms to the standard specification of the personal Computer Memory Card International Association. Referring now to FIGS. 2 and 3, the PCMCIA card 30 includes a microprocessor 44, redundant non-volatile memory (NVM) 46, clock 48, an encryption module 50 and an accounting module 52. The vault includes an interface 56 that communicates with the host processor 22 through PCMCIA controller 32. The encryption module 50 may implement the NBS Data Encryption Standard (DES) or another suitable encryption scheme. In the preferred embodiment, encryption module 50 is a software module. It will be understood that encryption module 50 could also be a separate device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-base meter 10 encapsulates all the processes involved in metering, and provides an open interface to vault 20 from all Windows-based applications capable of using a dynamic link library. Any application program 36 can communicate with vault microprocessor 44 in PCMCIA card 30 through DLL 40.

Figure 4:
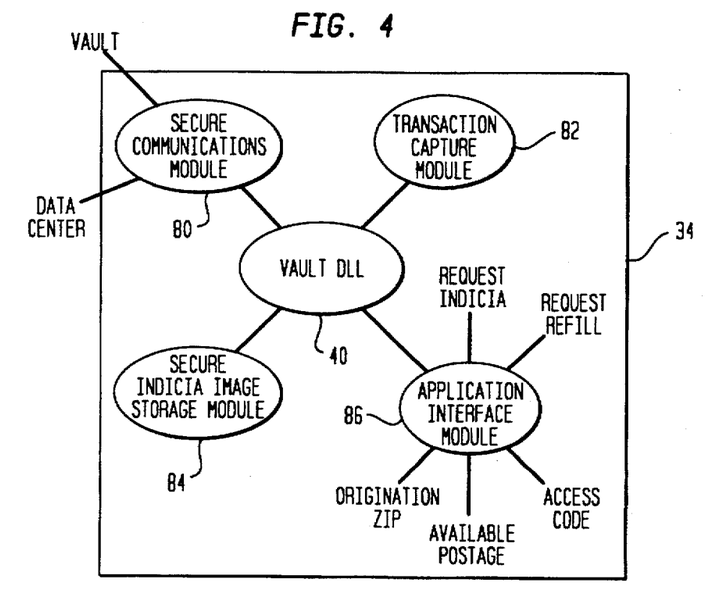
FIG. 4 is a block diagram of the DLL sub-modules in the PC-based metering system of FIG. 1.

DLL 40 includes the following software sub-modules. Secure communications sub-module 80 controls communications between PC 12 and vault 20. Transaction captures sub-module 82 stores transaction records in PC 12. Secure indicia image creation and storage sub-module 84 generates an indicia bitmap image and stores the image for subsequent printing. Application interface sub-module 86 interfaces with nonmetering application programs and issues requests for digital tokens in response to requests for indicia by the non-metering application programs. Detailed descriptions of PC meter system 10, including the processing of the various sub-modules, and the digital token generation process are provided in related U.S. patent applications Ser. Nos. [Attorney Docket E-421] and [Attorney Docket E-416] filed concurrently herewith, each of which is incorporated herein in its entirety by reference.

Since printer 18 is not dedicated to the metering function, issued digital tokens may be requested, calculated and stored in PC 12 for use at a later time when, at a user's discretion, corresponding indicia are generated and printed. Such delayed printing and batch processing is described in more detail in co-pending U.S. patent application Ser. No. [Attorney Docket E-452], which is incorporated herein in its entirety by reference.

Figure 5:
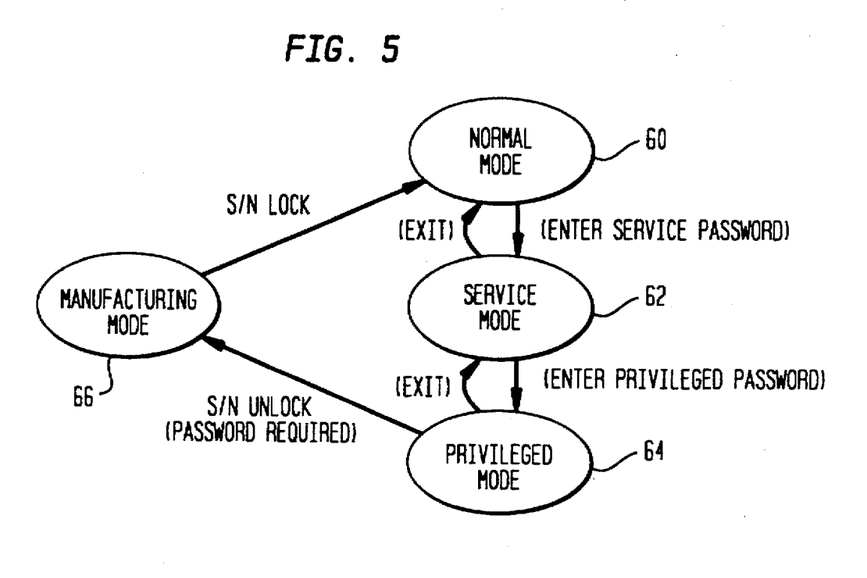
FIG. 5 is a flow diagram of vault mode transitions in the PC-based metering system of FIG. 1.

Referring now to FIG. 5, vault 20 has four security access levels: normal mode 60, service mode 62, privileged mode 64 and manufacturing mode 66. In normal mode 60, commands available to users are processed. In service mode 62, normal mode commands and service related commands are processed. In privilege mode 64, all command except direct access to NVM are processed. In manufacturing mode 66, all commands are processed. An access level is assigned to every command that is processed by the vault. Passwords are assigned to the various access levels. For example, to enter service mode 62 from the normal mode 60, a service password is required. Another password is required to enter privileged mode 64. Thus, two passwords, service and privileged, must be entered to access privileged mode 64. Privileged mode 64 cannot be accessed from normal mode 60 or manufacturing mode 66.

When a 'blank' vault is manufactured, a manufacturing vendor puts vault 20 in manufacturing mode 66 to program the NVM 46 of PCMCIA card 30. NVM 46 is programmed with encryption, accounting, funds management and other vault software modules. Then the vendor locks a serial number in NVM 46, prohibiting any unauthorized access to NVM 46, before delivering PCMCIA card 30 to a user. The vendor programs vault 20 to default to normal mode 60 whenever power is applied. A manufacturing mode password is required, i.e. vault 20 must be in manufacturing mode, to unlock the serial number in vault 20.

User Password System

In accordance with the present invention, a user password system of the vault is designed to protect the user postal funds while allowing multiple users to have access to PC-base metering system 10. The vault allows each of the multiple users to activate the password system, to log into the vault, to request indicia and to log out from the vault. Other functions of PC-based metering system 10, such as obtaining accounting summaries, authorizing new users to enter passwords, and refilling the vault, require a higher level access.

When the vault is manufactured, it can be operated without a user password. The very first entry of a user password to the vault activates the vault password system, and this entry is regarded as password entered. Once activated, the vault will ask for a user to enter a valid password at each log in. The vault functions available to a user depends on access level of the entered user password.

Only a user having an active user password can change the user password. After a period of time, the vault may require a user to change the current password. If the vault is idle for a predetermined amount of time, the vault may log out automatically which requires the next use of the vault to be preceded by a valid user password entry. Preferably, a valid password is any combination of 4 to 10 alphanumeric characters. If a user forgets the password assigned to the user. If so, a privileged user must reinitialize the forgetful user's password. When the privileged user forgets the privileged password, the privileged user has the choice of requesting a service call to have a service password reinitialize the privileged password or the privileged user can call the data center to obtain a super password that will deactivate the user password. The super password is designed for one-time use only. The super password system and method is described in previously noted U.S. patent application Ser. No. [Attorney Docket No. E-463], which is incorporated herein by reference.

Figure 6:
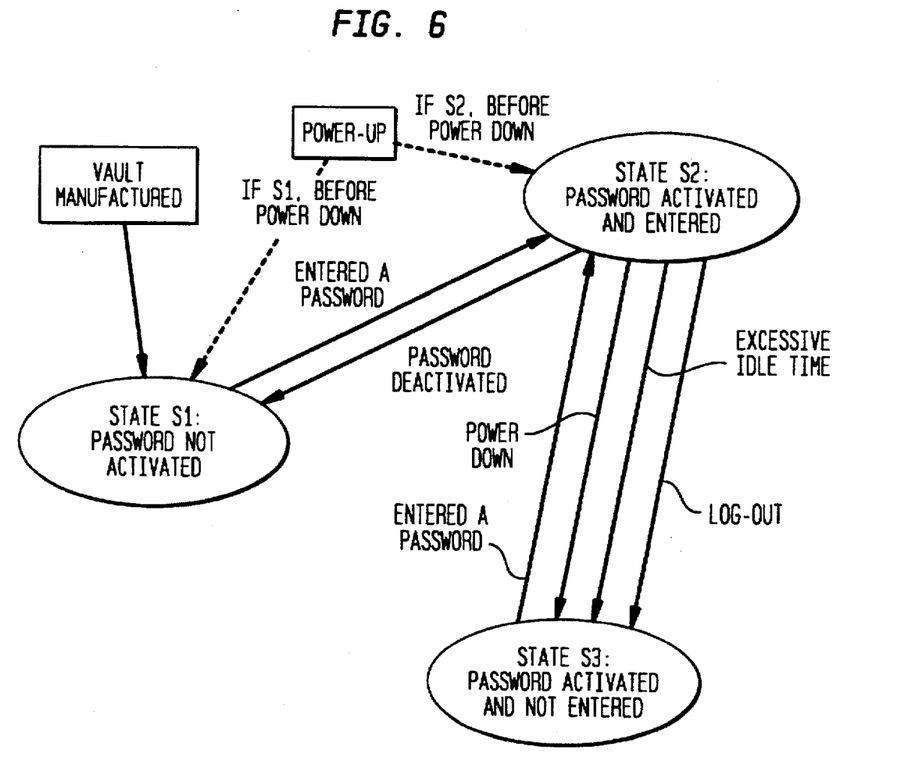
FIG. 6 is a flow diagram of state transitions for the vault password system in accordance with the present invention.

Referring now to FIG. 6, a flow diagram of state transitions within the vault password system is shown. In accordance with the present invention, there are three states for the vault password system. S1 represents a state wherein the password system is not activated. This is the state of the vault when it is first manufactured and when upon vault power-up when the password system has not been activated. In this state, the vault can be accessed by any user without entering a user password. S2 represents a state wherein the user password system has been activated by an initial entry of a user password. Once activated, the user password system remains in S2 until a user who has an access level that can deactivate the user password system deactivates the system to state S1. Finally, S3 represents a state wherein the user password system has been activated but a user password is not currently entered. The vault changes from state S2 to state S3 whenever the vault is powered down, the vault automatically logs off because of excessive idle time, or a user logs out of the vault.

In the preferred embodiment of the present invention, the user password system runs as a hidden file in DLL in PC 12. However, the user password system could run in vault 20 for a higher level of security.

Managing Multiple Users

The present invention provides added security and flexibility by allowing selective access to the features and functions available to users of the PC-based open metering system. PC-based postage meter 10 can function as a multiple-user device in which multiple users can have different access privilege levels to the meter features and functions. In the preferred embodiment, a setup routine will allow the primary or administrative user of PC-based postage meter 10 to customize individual user passwords for access to the different meter features and functions.

For example, performance of the meter refill function may be restricted to the owner of the meter or a user assigned as an administrative user. This restriction is a common security feature since refilling the meter is spending money. The meter owner may also limit the number of users that are authorized to perform other functions of the meter, for example, changing any of the meter parameters, such as postage limit. Such users may share a single password to perform certain level(s) of functions or may each be given an individual password for added security. PC-based postage meter 10 keeps a log, which is stored on hard drive 24, of all transactions and logins for further security.

Access to accounting and account reporting may also be restricted. A user must enter the correct password in order to access such a restricted function. The present invention also provides for sub-levels of user access as a means for limiting access to certain information that should not be available to all users. For example, some users may be restricted from destination addresses of a certain geographical area that other users may access.

Figure 7:
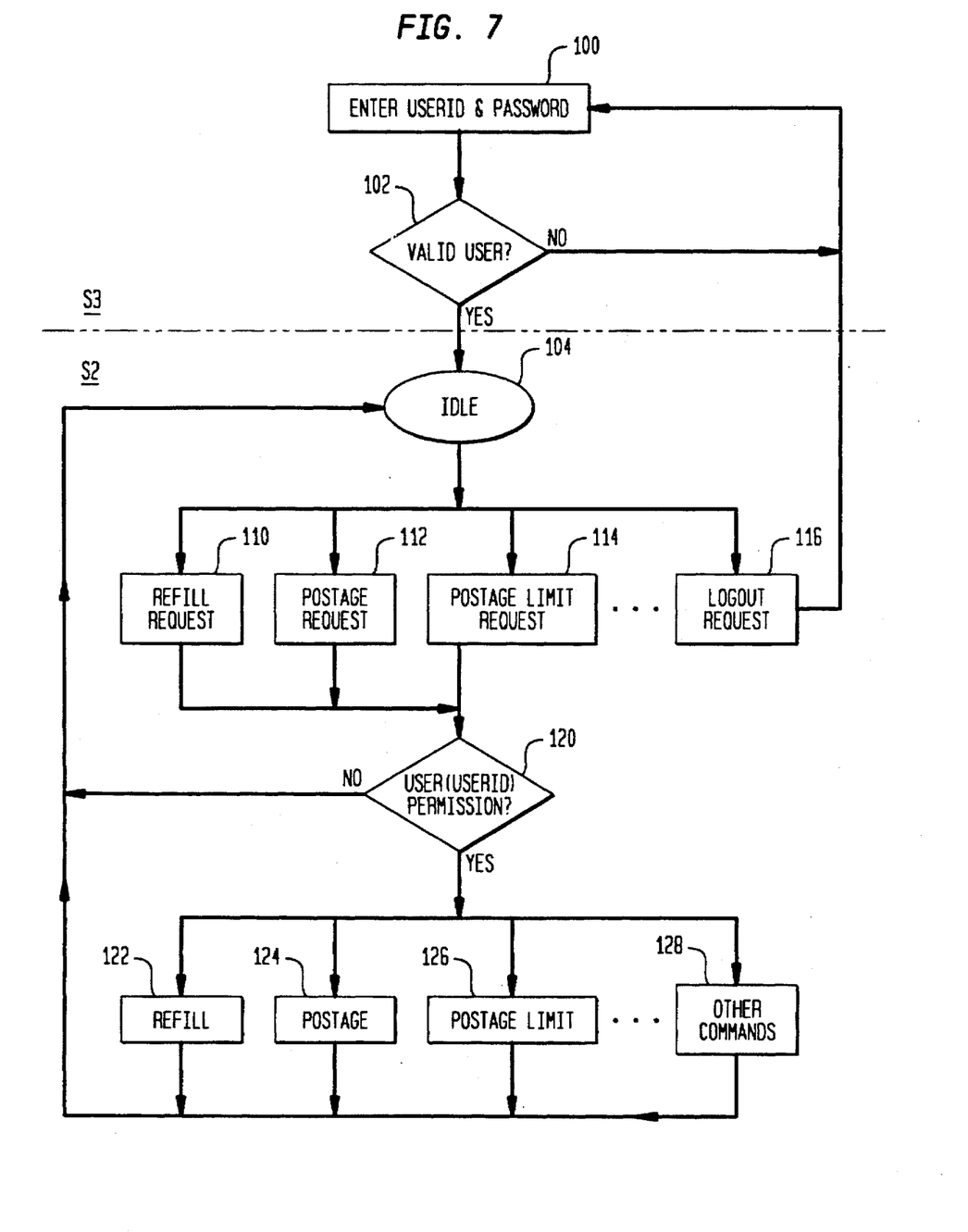
FIG. 7 is a flow chart for managing multiple users with different privileges for a PC-based metering system in accordance with the present invention.

Referring now to FIG. 7, the a flow chart for managing multiple users with different access privileges is shown. At step 100, the vault is in state S3 when the user enters a user password. In the preferred embodiment the user password entry is combined with a user identification code for further security. At step 102, a check is made to determine if the entry is a valid user password. If it is, the vault changes state to S2 and remains idle, at step 104, until a request made by the user is received by vault 20 from PC 12. Examples of the possible requests are shown at steps 110–116. At step 120, a check is made to determine if the entered user password is authorized to perform such request. If not, the vault returns to an idle status at step 104, preferably sending a message to the user that the request is not authorized. If authorized, at steps 122–128, the requested function is performed. If the request at step 116 is for logout, then the user password system changes to state S3 and requires a user password at step 100.

Figure 8:
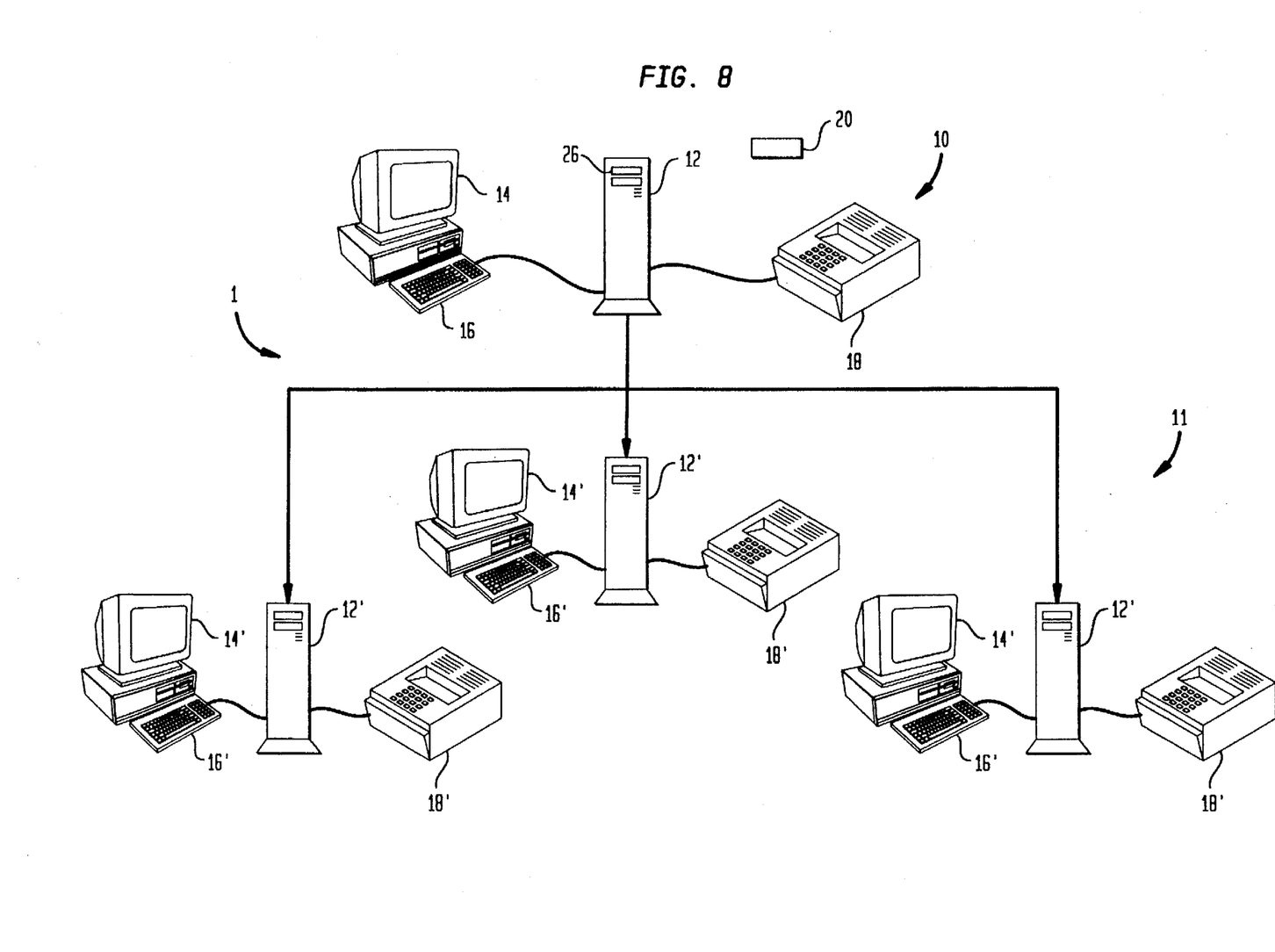
FIG. 8 is a block diagram of a network-based open metering system in which the present invention operates.

Referring now to FIG. 8, a network-based open metering system 1 has the same user mode levels of security model as the local version PC-based postage meter 10. Different users can be given different security levels within the user mode in order to access different meter services related to each user's use of the metering system. One example of a security level is departmental accounting reports to which each user may be given access only to the user's department's accounting report. A more detailed description of the network metering system 1 is found in the previously note U.S. patent application Ser. No. [Attorney Docket No. E-444].

As used herein, the term password is used generically and refers to present and future methods for authenticating users. This may include data a user knows, such as a PIN or passphrase; something a user has, such as a magnetic stripe card, smart card or diskette; user biometric data, such as a fingerprint, voice print or retinal scan; or any combination of the above.

It will be understood that the present invention is not limited to managing multiple users of an open postage metering system. The present invention applies to any transaction evidencing system in which a block of information is used to authenticate a document and the information is later scanned from the document in the verification process.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of managing multiple users of an open metering system, wherein the users have different access privileges, the method comprising the steps of:

providing a user password system for vault access;

programing the vault with a plurality of transition states operatively relating to the user password system;

assigning vault functional access to each user password first entered into the user password system; and performing a requested vault function when an entered user password under which the request is made has been assigned vault functional access for the requested vault function.

2. The method of claim 1, comprising the further steps of:

manufacturing the vault in a first state in which the user password system is not activated; and activating the user password system upon entry of an initial user password which changes the vault to a second state that accepts requests for vault functions.

3. The method of claim 2, comprising the further step of:

changing the vault to a third state from the second state wherein the user password system remains activated but another user password must be entered before a further request for a vault function is accepted.

4. The method of claim 1, comprising the further step of:

rejecting the requested vault function when the entered user password under which the request is made has not been assigned vault functional access for the requested vault function.

5. A transaction evidencing system, comprising a personal computer (PC) including processor, memory and storage means, said storage means including at least one non-metering application program that is selectively run on said PC;

an unsecured printer operatively coupled to said PC for printing in accordance with said non-metering application program;

vault means operatively coupled to said PC, said vault means including digital token generation means and transaction accounting means, said vault means further including a user password system for vault access, said vault access including functional access based on an entered user password;

means in said PC for interfacing with said non-metering application program, said interfacing means issuing a request for at least one digital token in response to a request for indicia from said non-metering application program, said request for digital token including predetermined information required by said token generation means;

means in said PC for communicating with said vault means, said communicating means sending said request for digital token to said vault means and receiving from said vault means a digital token generated by said token generation means; and means in said PC for generating an indicia bitmap from said digital token, wherein said interfacing means sends said indicia bitmap to said non-metering application program;

wherein a requested vault function is performed by the vault means when an entered user password under which the request is made has been assigned vault functional access for the requested vault function.

6. The transaction evidencing system of claim 5 wherein said vault means comprises a portable vault card that is removably coupled to said PC, said PC including means for removably coupling said vault card to said PC.

7. The transaction evidencing system of claim 5 wherein said vault means is manufactured in a first state in which the user password system is not activated, said vault means activating the user password system upon entry of an initial user password which changes the vault to a second state that accepts requests for vault functions.

8. The transaction evidencing system of claim 7 wherein said vault means changes to a third state from the second state under certain conditions wherein the user password system remains activated but another user password must be entered before a further request for a vault function is accepted.

9. The transaction evidencing system of claim 8 wherein said certain conditions include excessive vault idle time, vault power down and user log-out.

10. A transaction evidencing system, comprising a personal computer (PC) including processor, memory and storage means, said storage means including at least one non-metering application program that is selectively run on said PC;

an unsecured printer operatively coupled to said PC for printing in accordance with said non-metering application program;

vault means operatively coupled to said PC, said vault means including digital token generation means and transaction accounting means, said vault means further including a user password system for vault access, said vault access including functional access based on an entered user password;

means in said PC for interfacing with said non-metering application program, said interfacing means issuing a request for at least one digital token in response to a request for indicia from said non-metering application program, said request for digital token including predetermined information required by said token generation means;

means in said PC for communicating with said vault means, said communicating means sending said request for digital token to said vault means and receiving from said vault means a digital token generated by said token generation means; and means in said PC for generating an indicia bitmap from said digital token;

wherein a requested vault function is performed by the vault means when an entered user password under which the request is made has been assigned vault functional access for the requested vault function.

* * * * *